US011409178B2

(12) United States Patent
Kim et al.

(10) Patent No.: US 11,409,178 B2
(45) Date of Patent: *Aug. 9, 2022

(54) LIGHT-TRANSMITTING FILM AND AN ELECTROCHROMIC DEVICE COMPRISING THE SAME

(71) Applicant: LG CHEM, LTD., Seoul (KR)

(72) Inventors: Yong Chan Kim, Daejeon (KR); Ki Hwan Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 227 days.

This patent is subject to a terminal disclaimer.

(21) Appl. No.: 16/604,841

(22) PCT Filed: Apr. 23, 2018

(86) PCT No.: PCT/KR2018/004672
§ 371 (c)(1),
(2) Date: Oct. 11, 2019

(87) PCT Pub. No.: WO2018/199570
PCT Pub. Date: Nov. 1, 2018

(65) Prior Publication Data
US 2020/0166818 A1  May 28, 2020

(30) Foreign Application Priority Data

Apr. 24, 2017 (KR) .................. 10-2017-0052047
Apr. 19, 2018 (KR) .................. 10-2018-0045418

(51) Int. Cl.
*G02F 1/1523* (2019.01)
*G02F 1/1524* (2019.01)
*G02B 26/02* (2006.01)

(52) U.S. Cl.
CPC .......... *G02F 1/1525* (2013.01); *G02B 26/02* (2013.01); *G02F 1/1524* (2019.01)

(58) Field of Classification Search
CPC ...................... G02F 1/1514; G02F 1/1524
(Continued)

(56) References Cited

U.S. PATENT DOCUMENTS 7,099,062 B2 * 8/2006 Azens ............. G02F 1/1523
359/265
10,481,457 B2 * 11/2019 Kim ............... G02F 1/1525
(Continued)

FOREIGN PATENT DOCUMENTS

CN  101310217 A  11/2008
CN  103460433 A  12/2013
(Continued)

OTHER PUBLICATIONS

M. A. Arvizu, G. A. Niklasson, and C. G. Granqvist; Chemistry of Materials 2017 29 (5), 2246-2253; DOI: 10.1021/acs.chemmater.6b05198 (Year: 2017).*
(Continued)

*Primary Examiner* — Zachary W Wilkes
(74) *Attorney, Agent, or Firm* — Birch, Stewart, Kolasch & Birch, LLP

(57) ABSTRACT

A light-transmitting film and a device including the light-transmitting film are disclosed. The light-transmitting film includes an oxynitride containing two or more metals selected from Ti, Nb, Mo, Ta and W, and having light transmittance of 60% or more. The oxynitride may be represented by Formula 1, which is $Mo_aTi_bO_xN_y$, where a>0, b>0, x>0, y>0, 0.5<a/b<4.0, and 0.005<y/x<0.02. The film has a light transmission characteristic, is capable of reversible color-switching depending on the applied voltage, and has excellent durability within a driving voltage range in which the film changes its color.

8 Claims, 2 Drawing Sheets

(58) Field of Classification Search
USPC .......................................................... 359/273
See application file for complete search history.

(56) References Cited

U.S. PATENT DOCUMENTS

| | | | |
|---|---|---|---|
| 2004/0234822 A1 | 11/2004 | Azens et al. | |
| 2006/0177746 A1 | 8/2006 | Yoshikawa et al. | |
| 2007/0139756 A1* | 6/2007 | Agrawal | G02F 1/15165 359/265 |
| 2009/0067031 A1 | 3/2009 | Piroux et al. | |
| 2014/0054578 A1 | 2/2014 | Thoumazet et al. | |
| 2014/0205746 A1 | 7/2014 | Choi et al. | |
| 2020/0166819 A1* | 5/2020 | Kim | G02F 1/15 |
| 2020/0255723 A1* | 8/2020 | Kim | G02F 1/1524 |

FOREIGN PATENT DOCUMENTS

| | | |
|---|---|---|
| JP | 2000-10126 A | 1/2000 |
| KR | 10-2006-0089643 A | 8/2006 |
| KR | 10-2007-0034431 A | 3/2007 |
| KR | 10-0758379 B1 | 9/2007 |
| KR | 10-2008-0070657 A | 7/2008 |
| KR | 10-1271371 B1 | 6/2013 |
| KR | 10-2014-0024883 A | 3/2014 |
| KR | 10-2014-0086325 A | 7/2014 |
| KR | 10-1501104 B1 | 3/2015 |
| KR | 10-2016-0104584 A | 9/2016 |
| KR | 10-2016-0115859 A | 10/2016 |
| WO | WO 91/17283 A1 | 11/1991 |
| WO | WO 2016/085823 A1 | 6/2016 |
| WO | WO 2017/061776 A1 | 4/2017 |

OTHER PUBLICATIONS

European Search Report for Appl. No. 18790688.8 dated Feb. 25, 2020.

International Search Report (PCT/ISA/210) issued in PCT/KR2018/004672, dated Jul. 26, 2018.

* cited by examiner

[Figure 2]
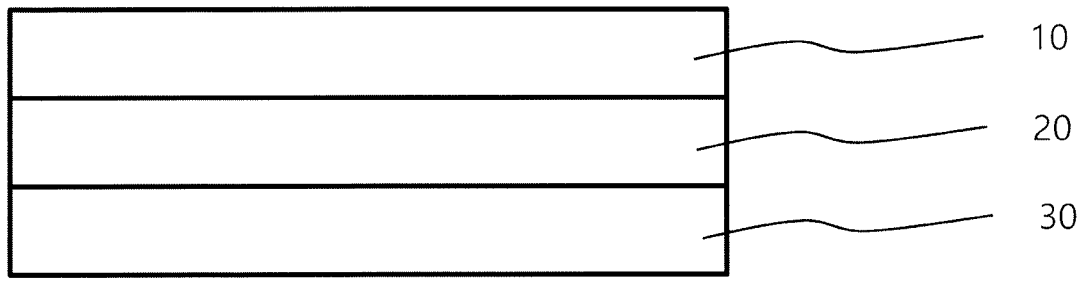
[Figure 3]
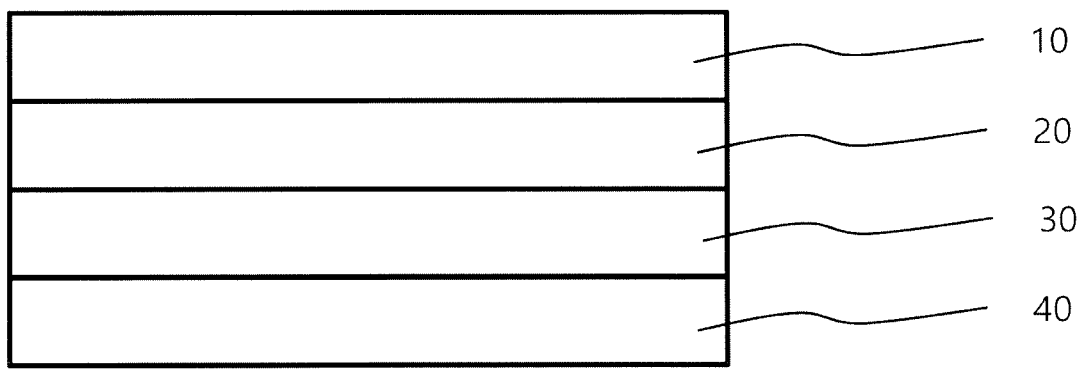
[Figure 4]
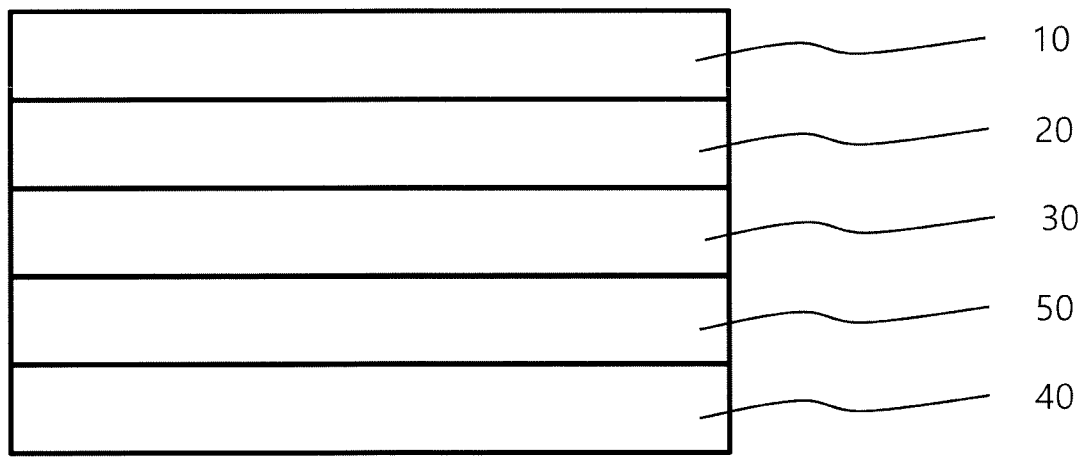

LIGHT-TRANSMITTING FILM AND AN ELECTROCHROMIC DEVICE COMPRISING THE SAME

TECHNICAL FIELD

Cross-Reference to Related Applications

This application claims the benefit of priority based on Korean Patent Application No. 10-2017-0052047 filed on Apr. 24, 2017 and Korean Patent Application No. 10-2018-0045418 filed on Apr. 19, 2018, the disclosures of which are incorporated herein by reference in their entirety.

TECHNICAL FIELD

The present application relates to a light-transmitting film and an electrochromic device comprising the same.

BACKGROUND ART

Electrochromism refers to a phenomenon in which an optical property of an electrochromic material is changed by a reversible electrochemical oxidation or reduction reaction, where the device using the phenomenon is referred to as an electrochromic device. In general, a change in the optical properties of a device can be realized through a change in color of the layer or film containing an electrochromic material. For example, when $WO_3$ which is almost colorless and transparent is used as an electrochromic material and electrolyte ions and electrons move by voltage application, a reduction reaction occurs and the color of the layer or film containing the electrochromic material is colored to a color of blue series. Conversely, when an oxidation reaction occurs in the layer or film, the layer or film is bleached to the original transparent state. In order that such electrochromic is sufficiently realized in the device, other layer or film structures to be laminated together, as well as the electrochromic layer or film in a bleached state must also have sufficient transparency (light transmission characteristic).

DISCLOSURE

Technical Problem

It is one object of the present application to provide a light-transmitting film usable in an electrochromic device.

It is another object of the present application to provide a light-transmitting film capable of reversible electrochromic depending on the applied voltage.

It is another object of the present application to provide a light-transmitting film for an electrochromic device having excellent durability.

It is another object of the present application to provide an electrochromic device comprising a light-transmitting film capable of reversible electrochromic depending on the applied voltage.

The above and other objects of the present application can be all solved by the present application which is described in detail below.

Technical Solution

In one example of the present application, the present application relates to a light-transmitting film. In the present application, the "light transmission characteristic" may mean a case of being transparent enough to be capable of clearly viewing a change in optical characteristics such as a color change occurring in an electrochromic device, and for example, may mean a case where the corresponding layer has light transmittance of at least 60% or more even in a state without any external factor such as potential application (that is, a bleached state as described below). More specifically, the lower limit of the light transmittance of the light-transmitting film of the present application may be 60% or more, 70% or more, or 75% or more, and the upper limit of the light transmittance may be 95% or less, 90% or less, or 85% or less. Unless otherwise specified, the "light" in the present application may mean visible light in a wavelength range of 380 nm to 780 nm, more specifically visible light having a wavelength of 550 nm. The transmittance can be measured using a known haze meter (HM).

The light-transmitting film may comprise an oxynitride. In one example, the light-transmitting film may be an oxynitride having one layer or film form, or may be a laminate of an oxynitride having a layer or film form with other layers or film structures. In the present application, the oxynitride is used separately from an oxide or a nitride.

In one example, the oxynitride may comprise two or more metals selected from Ti, Nb, Mo, Ta and W.

In another example, the oxynitride of the light-transmitting film may comprise Mo and Ti simultaneously. In this connection, the nitride, oxide or oxynitride containing only Mo has poor adhesion with the adjacent thin film, and the nitride, oxide or oxynitride containing only Ti has poor durability, such as decomposition upon potential application. Particularly, since the nitride or oxynitride containing any one of the metals listed above, for example, Ti alone or Mo alone, has a low light transmission characteristic, such as visible light transmittance of 40% or less, 35% or less, or 30% or less, even in a state where no potential or the like is applied, it is not suitable for use as a member for an electrochromic film which requires transparency upon bleaching. In addition, when a film having a low transmittance upon bleaching as above is used, for example, when the difference between the transmittance upon coloring and the transmittance upon bleaching is 30% or more, it is difficult to show a clear optical characteristic change of coloring and bleaching required in an electrochromic device.

In one example, the oxynitride can be represented by Formula 1 below.

$$Mo_aTi_bO_xN_y \qquad \text{[Formula 1]}$$

In Formula 1, a represents an elemental content ratio of Mo, b represents an elemental content ratio of Ti, x represents an elemental content ratio of O, and y represents an elemental content ratio of N, where a>0, b>0, x>0, y>0, 0.5<a/b<4.0, and 0.005<y/x<0.02. In the present application, the term "elemental content ratio" may be atomic % and may be measured by XPS (X-ray photoelectron spectroscopy). When the elemental content ratio (a/b) is satisfied, a film having excellent adhesion to other layer constitutions as well as durability can be provided. When the elemental content ratio (y/x) is satisfied, the film may have light transmittance of 60% or more. Particularly, when the elemental content ratio (y/x) is not satisfied, the film has very low transparency (light transmission characteristic), such as visible light transmittance of 40% or less, or 35% or less, and thus the relevant film cannot be used as a member for an electrochromic device.

In one example, the light-transmitting film may be a variable transmittance film whose light transmission characteristic changes when a predetermined voltage is applied. The variable transmittance characteristic is attributed to the reduction-electrochromic characteristic of the oxynitride as described above. Specifically, the oxynitride contained in the film has a light transmission characteristic close to achroma in the original state without an electrochemical reaction, but when a predetermined voltage is applied, it can change its color, that is, colored while performing a reduction reaction with electrolyte ions at a certain level or more. That is, the oxynitride is a reducing electrochromic material. When the light-transmitting film is colored, its light transmittance is lowered to less than 60%. In summary, the film is an electrochromic variable transmittance film which is capable of having light transmittance of 60% or more upon bleaching (or decoloring) and has light transmittance of less than 60% upon coloring.

In one example, the light-transmitting film may be colored under a voltage application condition of −2V or less, for example, −2.5V or less, or −3V or less. That is, the coloration level of the light-transmitting film may be 2V, 2.5V or 3V. In the present application, the "coloration level" may mean "a minimum magnitude (absolute value)" of a voltage capable of causing coloration of the relevant film, such as the case that while an electrochemical reaction is induced by a voltage of a predetermined magnitude applied to a light-transmitting film, or a laminate (half-cell) comprising the film and a conductive layer, so that the light-transmitting film has a color, the transmittance of the film is lowered. Since the coloration level, that is, the minimum magnitude (absolute value) of the voltage causing the coloration functions as a kind of barrier against the coloration, when a potential of a value smaller than the magnitude (absolute value) is applied, the coloring does not actually occur (even if the coloring occurs finely, it cannot be recognized by the user or is not sufficient to be recognized). The coloration level of the light-transmitting film may vary somewhat depending on the specific configuration in a range of 2V or more. When coloring, the light-transmitting film may have a color of (dark) gray or black series. Considering that the coloration level of a known electrochromic material, for example, an oxide including any one of Ti, Nb, Mo, Ta and W is 1V or so, it can be said that the light-transmitting film of the present application has excellent durability against high voltage.

With respect to the coloration level, the upper limit of the voltage magnitude (absolute value) applied for coloring the film is not particularly limited, but may be, for example, 6V or less. If it exceeds 6V, the light-transmitting film or other adjacent structures may deteriorate.

In one example, the light-transmitting film may have a thickness of 150 nm or less. For example, the light-transmitting film may have a thickness of 140 nm or less, 130 nm or less, or 120 nm or less. If it exceeds the upper limit of the thickness, the insertion or desorption of electrolyte ions may be lowered, and the color-switching speed may be lowered. The lower limit of the thickness of the light-transmitting film is not particularly limited, but may be, for example, 10 nm or more, 20 nm or more, or 30 nm or more. If it is less than 10 nm, thin film stability is poor.

In one example, the light-transmitting film may have a light refractive index in a range of 1.5 to 3.0 or in a range of 1.8 to 2.8. If it has the visible light refractive index in the above range, the light-transmitting film can realize appropriate transparency, and visibility for an optical property change.

The method of forming the light-transmitting film is not particularly limited. For example, a known deposition method such as sputtering deposition may be used upon forming the light-transmitting film, provided that the above configuration is satisfied.

In another example of the present application, the present application relates to an electrochromic device. The device (100) may comprise an electrode layer (10), a light-transmitting film (20) and an electrolyte (layer) (30), as presented in FIG. 2. The form in which the device comprises an electrode layer, a light-transmitting film and an electrolyte (layer) is not particularly limited. For example, the device may comprise an electrode layer (10), a light-transmitting film (20) and an electrolyte (layer) (30) sequentially.

The light-transmitting film used in the electrochromic device may have the same configuration as described above. Since the light-transmitting film having the above configuration may have visible light transmittance of 60% or more, it is suitable as a film for an electrochromic device. Furthermore, as described above, since it may be colored when a predetermined voltage is applied, it may also be used as a so-called electrochromic layer. Specifically, the light-transmitting film itself may have transmittance of 60% or more upon bleaching, that is, in a state where it is not colored, and the light-transmitting film may have transmittance of less than 60%, for example, transmittance of 45% or less, 30% or less, or 20% or less, while lowering the transmittance upon coloring. In one example, the light transmittance film may have a light transmittance difference of 20% or more, or 30% or more upon coloring and bleaching.

Without being particularly limited, other structures used together in the electrochromic device, in addition to the light-transmitting film, may also have visible light transmittance in a range of 60% or more, more specifically 60% to 95%. In one example, the electrochromic device may have a light transmittance difference of 10% or more, 20% or more, or 30% or more upon coloring and bleaching.

The electrode layer may comprise a conductive compound, a metal mesh, or an OMO (oxide/metal/oxide).

In one example, the transparent conductive compound used in the electrode layer may be exemplified by ITO (indium tin oxide), $In_2O_3$ (indium oxide), IGO (indium gallium oxide), FTO (fluorodo doped tin oxide), AZO (aluminum doped zinc oxide), GZO (gallium doped zinc oxide), ATO (antimony doped tin oxide), IZO (indium doped zinc oxide), NTO niobium doped titanium oxide), ZnO (zinc oxide) or CTO (cesium tungsten oxide), and the like. However, the material of the transparent conductive compound is not limited to the above-listed materials.

In one example, the metal mesh used for the electrode layer comprises Ag, Cu, Al, Mg, Au, Pt, W, Mo, Ti, Ni or an alloy thereof, which may have a lattice form. However, the material usable for the metal mesh is not limited to the above-listed metal materials.

In one example, the electrode layer may comprise an OMO (oxide/metal/oxide). Since the OMO has lower sheet resistance over the transparent conductive oxide typified by ITO, the improvement of the electrical characteristics of the electrochromic device, such as shortening the color-switching speed, can be achieved.

The OMO may comprise an upper layer, a lower layer, and a metal layer provided between the two layers. In the present application, the upper layer may mean a layer located relatively farther from the light-transmitting film among the layers constituting the OMO.

In one example, the upper and lower layers of the OMO electrode may comprise an oxide of Sb, Ba, Ga, Ge, Hf, In, La, Se, Si, Ta, Se, Ti, V, Y, Zn, Zr or an alloy thereof. The types of the respective metal oxides included in the upper layer and the lower layer may be the same or different.

In one example, the upper layer may have a thickness in a range of 10 nm to 120 nm or in a range of 20 nm to 100 nm. In addition, the upper layer may have a visible light refractive index in a range of 1.0 to 3.0 or in a range of 1.2 to 2.8. Having the refractive index and thickness in the above ranges, appropriate levels of optical characteristics can be imparted to the electrode layer and the device.

In one example, the lower layer may have a thickness in a range of 10 nm to 100 nm or in a range of 20 nm to 80 nm. In addition, the lower layer may have a visible light refractive index in a range of 1.3 to 2.7 or in a range of 1.5 to 2.5. Having the refractive index and thickness in the above ranges, appropriate levels of optical characteristics can be imparted to the electrode layer and the device.

In one example, the metal layer included in the OMO electrode may comprise a low resistance metal material. Without being particularly limited, for example, one or more of Ag, Cu, Zn, Au, Pd and an alloy thereof may be included in the metal layer.

In one example, the metal layer may have a thickness in a range of 3 nm to 30 nm or in a range of 5 nm to 20 nm. In addition, the metal layer may have a visible light refractive index of 1 or less, or 0.5 or less. Having the refractive index and thickness in the above ranges, appropriate levels of optical characteristics can be imparted to the electrode layer and the device.

Without being particularly limited, the electrode layer having the above configuration may have a thickness of 50 nm to 400 nm or less. The light transmittance can be appropriately realized within the above thickness range.

In one example, the device (100) may comprise another electrode layer, as presented in FIG. 3. In this case, the electrode layers may be referred to as a first electrode layer (40) and a second electrode layer (10) depending on relative positions with other structures. For example, the device may comprise a first electrode layer (40), an electrolyte layer (30), the light-transmitting film (20) and a second electrode layer (10) sequentially. The structure of each electrode layer is the same as described above.

The electrolyte layer may be a constitution providing electrolyte ions involved in the electrochromic reaction. The electrolyte ion may be a monovalent cation, for example, H, $Li^+$, $Na^+$, $K^+$, $Rb^+$ or $Cs^+$, which may be inserted into the light-transmitting film to participate in a electrochromic reaction.

The type of the electrolyte is not particularly limited. For example, a liquid electrolyte, a gel polymer electrolyte or an inorganic solid electrolyte may be used without limitation.

The composition of the specific compound used in the electrolyte layer is not particularly limited as long as it can comprise a compound capable of providing a monovalent cation such as $H^+$, $Li^+$, $Na^+$, $Rb^+$ or $Cs^+$ to the configuration of the film capable of electrochromism. For example, the electrolyte may comprise a lithium salt compound such as $LiClO_4$, $LiBF_4$, $LiAsF_6$ or $LiPF_6$, or a sodium salt compound such as $NaClO_4$.

In another example, the electrolyte layer may comprise a carbonate compound as a solvent. Since the carbonate-based compound has a high dielectric constant, ion conductivity can be increased. As a non-limiting example, a solvent, such as PC (propylene carbonate). EC (ethylene carbonate), DMC (dimethyl carbonate), DEC (diethyl carbonate) or EMC (ethylmethyl carbonate), may be used as the carbonate-based compound.

In one example, when the electrolyte layer comprises a gel polymer electrolyte, the electrolyte layer may comprise a polymer such as, for example, polyvinylidene fluoride (PVdF), polyacrylonitrile (PAN), polymethylmethacrylate (PMMA), polyvinyl chloride (PVC), polyethylene oxide (PEO), polypropylene oxide (PPO), poly(vinylidene fluoride-hexatluoropropylene) (PVdF-HFP), polyvinyl acetate (PVAc), polyoxyethylene (POlE) and polyamideimide (PAI).

Without being particularly limited, the electrolyte layer may have a thickness in a range of 10 μm to 200 μm.

In one example, the electrochromic device of the present application may further comprise a second electrochromic layer, as presented in FIG. 4. When the second electrochromic layer is included in the device (100), the device may further comprise the second electrochromic layer (50) between the first electrode layer (40) and the electrolyte (30). In this case, the light-transmitting film capable of electrochromism may be referred to as a first electrochromic layer.

The second electrochromic layer may have electrochromic characteristics different from those of the first electrochromic layer. That is, the second electrochromic layer may comprise an oxidizing electrochromic material that can be colored when oxidized. When the electrochromic materials used in the first and second electrochromic layers have different coloring (electrochromic) characteristics, the second electrochromic layer may match charge balance with the first electrochromic layer.

In one example, the oxidizing electrochromic material included in the second electrochromic layer may be one or more selected from an oxide of Cr, Mn, Fe, Co, Ni, Rh or Ir, such as LiNiOx, $IrO_2$, NiO, $V_2O_5$, $LixCoO_2$, $Rh_2O_3$ or $CrO_3$; a hydroxide of Cr, Mn, Fe, Co, Ni, Rh or Ir; and prussian blue.

Without being particularly limited, the second electrochromic layer may have a thickness in a range of 50 nm to 450 nm.

In one example, the electrochromic device may further comprise a base material. The base material may be located on a lateral surface of the device, for example, on lateral surfaces of the first and/or second electrode layers.

The base material may also have visible light transmittance in a range of 60% to 95%. If the transmittance in the above range is satisfied, the type of the base material to be used is not particularly limited. For example, glass or a polymer resin may be used. More specifically, a polyester film such as PC (polycarbonate), PEN (poly(ethylene naphthalate)) or PET (poly(ethylene terephthalate)), an acrylic film such as PMMA (poly(methyl methacrylate)), or a polyolefin film such as PE (polyethylene) or PP (polypropylene), and the like may be used, without being limited thereto.

In another example, the electrochromic device may further comprise a power source. The method of electrically connecting the power source to the device is not particularly limited, which may be suitably performed by those having ordinary knowledge in the related technical field.

Advantageous Effects

According to one example of the present application, a film capable of reversible electrochromic depending on the applied voltage and having excellent durability against high voltage as well as having a light transmission characteristic can be provided.

BRIEF DESCRIPTION OF DRAWINGS

FIG. 2 is an electrochromic device according to an embodiment.

FIG. 3 is an electrochromic device according to an embodiment.

FIG. 4 is an electrochromic device according to an embodiment.

BEST MODE

Figure 1:
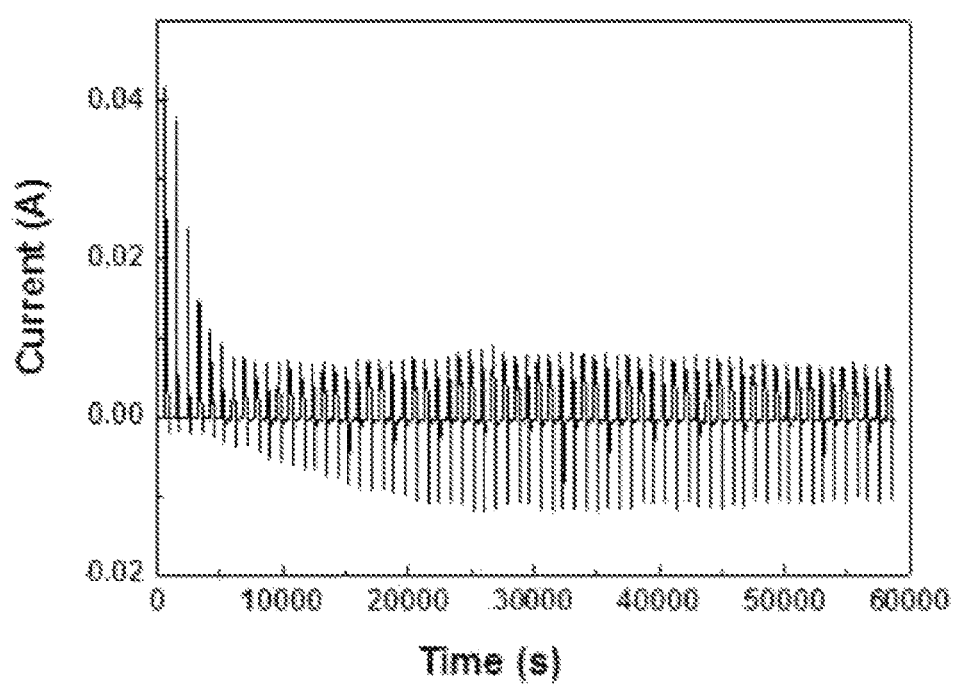
FIG. 1 is a graph showing an appearance in which the laminate of Example 1 of the present application is driven without lowering durability when a voltage of ±5V is applied.

Hereinafter, the present application will be described in detail through Examples. However, the scope of protection of the present application is not limited by Examples to be described below.

Experimental Example 1: Elemental Content of Oxynitride Layer and Comparison of Transmittance Thereof Example 1

Production of Laminate:

ITO having light transmittance of about 90% was formed on one side of glass having light transmittance of about 98%. Thereafter, a layer of an oxynitride ($Mo_aTi_bO_xN_y$) containing Mo and Ti was formed to a thickness of 30 nm on the ITO surface (opposite to the glass position) using sputtering deposition (Production Example 1). Specifically, the deposition was performed at a weight % ratio of Mo and Ti targets of 1:1, a deposition power of 100 W and a process pressure of 15 mTorr, and flow rates of Ar, $N_2$ and $O_2$ were 30 sccm, 5 sccm and 5 sccm, respectively.

Measurement of Physical Properties:

The content ratio of each element in the oxynitride layer and the transmittance of the laminate were measured and described in Table 1. The elemental content (atomic %) was measured by XPS (X-ray photoelectron spectroscopy) and the transmittance was measured using a haze meter (solidspec 3700).

Comparative Example 1

An oxynitride layer was formed in the same manner as in Example 1, except that the flow rate of nitrogen was 10 sccm at the time of deposition and the content ratios were changed as in Table 1 (Production Example 2).

Comparative Example 2

An oxynitride layer was formed in the same manner as in Example 1, except that the flow rate of nitrogen was 15 sccm at the time of deposition and the content ratios were changed as in Table 1 (Production Example 3).

Comparative Example 3

An oxynitride layer was formed in the same manner as in Example 1, except that the flow rate of nitrogen was 0 sccm at the time of deposition and the content ratios were changed as in Table 1 (Production Example 4).

TABLE 1

| | N | Ti | O | Mo | a/b | y/x | Transmittance (%) |
|---|---|---|---|---|---|---|---|
| Production Example 1 | 0.6 ± 0.0 | 13.1 ± 0.2 | 57.3 ± 0.3 | 29.5 ± 0.5 | 2.251908 | 0.0105 | 80 |
| Production Example 2 | 2.7 ± 0.6 | 14.4 ± 0.3 | 44.8 ± 0.9 | 33.0 ± 0.5 | 2.291667 | 0.0603 | 11 |
| Production Example 3 | 3.3 ± 0.4 | 15.5 ± 0.2 | 33.5 ± 0.3 | 33.5 ± 0.4 | 2.16129 | 0.0985 | 5 |
| Production Example 4 | not detected | 15.5 ± 0.2 | 51.6 ± 0.4 | 32.9 ± 0.3 | 2.12 | — | 15 |

From Table 1, it can be deduced that the oxynitride layers of Comparative Examples 1 to 3 have very low transmittance, but the oxynitride layer of Example 1 has transmittance of about 90%. Unlike Comparative Examples, the oxynitride used in Example 1 or the light-transmitting laminate comprising the same can be used as a member for an electrochromic device.

Experimental Example 2: Confirmation of Electrochromic Characteristics

Example 2

The laminate (glass/ITO/oxynitride ($Mo_aTi_bO_xN_y$)) (half-cell) produced in Example 1 was immersed in an electrolytic solution containing $LiClO_4$ (1M) and propylene carbonate (PC) and a coloring voltage of −3V and a bleaching voltage of +3V were alternately applied at 25° C. for 50 seconds, respectively. The currents, transmittances and color-switching times upon coloring and bleaching measured over time are as described in Table 2.

In addition, the measurements were performed for ±4V and ±5V, and the results were described in Table 2.

TABLE 2

| Driving Potential | Charge Quantity (mC/cm$^2$) | Colored | | | Bleached | | | ΔT |
| | | Peak Current (mA) | T (%) | Elapsed Time (s) | Peak Current | T (%) | Elapsed Time (s) | |
|---|---|---|---|---|---|---|---|---|
| ±5 V | 60 | 107 | 30 | 25 | 118 | 61 | 13 | 31 |
| ±4 V | 50 | 88 | 38 | 22 | 92 | 60 | 13 | 22 |
| ±3 V | 40 | 68 | 45 | 19 | 88 | 60 | 12 | 15 |

Size of laminate (width × length): 2.5 cm × 10 cm
Glass sheet surface: 10Ω/□
Charge quantity: measured by potential step chronoamperometry (PSCA) using a potentiostat device.
Colored elapsed time (s): the time taken to reach the 80% level of the final coloring state transmittance observed after the elapse (50 s) of the application time of the potential for coloring
Bleached elapsed time (s): the time taken to reach the 80% level of the final bleaching state transmittance observed after the elapse (50 s) of the application time of the potential for bleaching
Driving potential: a voltage of a predetermined magnitude actually applied for coloring and bleaching of the laminate (half cell). The bleaching potential and the coloring potential are the same in magnitude but different in sign.

As in Table 2, it can be confirmed that the laminate comprising the light-transmitting film of the present application has electrochromic characteristics when a potential having a magnitude of 3V or more is applied.

On the other hand, FIG. 1 is a graph showing an appearance in which the laminate of Example 2 (electrochromic device) is driven when a driving potential of ±5V is applied. It can be confirmed from FIG. 1 that the laminate comprising the light-transmitting film of the present application exhibits uniform cycle characteristics even when a relatively high driving potential is applied, and operates without lowering durability.

The invention claimed is:

1. A light-transmitting film, comprising:
an oxynitride represented by Formula 1:

$$Mo_aTi_bO_xN_y$$ Formula 1 wherein a represents an elemental content ratio of Mo, b represents an elemental content ratio of Ti, x represents an elemental content ratio of O, and y represents an elemental content ratio of N, where a>0, b>0, x>0, y>0, 0.5<a/b<4.0, and 0.005<y/x<0.02,
wherein the film is a variable transmittance film and has a light transmittance of 60% or more in a bleached state.

2. The light-transmitting film according to claim 1, wherein the film has a thickness of 150 nm or less.

3. The light-transmitting film according to claim 1, wherein the film has a visible light refractive index in a range of 1.5 to 3.0.

4. The light-transmitting film according to claim 1, wherein the film has a coloration level of an applied voltage of 2V or more.

5. An electrochromic device comprising an electrode layer; the light-transmitting film according to claim 1 as a first electrochromic layer; and an electrolyte layer.

6. The electrochromic device according to claim 5, comprising a first electrode layer, the electrolyte layer, the first electrochromic layer, and a second electrode layer sequentially.

7. The electrochromic device according to claim 6, further comprising a second electrochromic layer between the first electrode layer and the electrolyte layer.

8. The electrochromic device according to claim 7, wherein the second electrochromic layer comprises an oxidizing electrochromic material.

* * * * *